(12) United States Patent
Zeng et al.

(10) Patent No.: US 8,950,790 B2
(45) Date of Patent: Feb. 10, 2015

(54) COMPUTER HOUSING STRUCTURE

(75) Inventors: Wei-Bin Zeng, Guangzhou (CN); Jie-Dong Chen, Guangzhou (CN); Gang Cheng, Guangzhou (CN)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 451 days.

(21) Appl. No.: 13/274,392

(22) Filed: Oct. 17, 2011

(65) Prior Publication Data

US 2012/0262038 A1 Oct. 18, 2012

(30) Foreign Application Priority Data

Apr. 14, 2011 (CN) .................. 2011 2 0108136 U

(51) Int. Cl.
*E05C 1/00* (2006.01)
*G06F 1/18* (2006.01)

(52) U.S. Cl.
CPC ............... *G06F 1/181* (2013.01); *Y10S 292/30* (2013.01)
USPC ..................................... 292/32; 292/DIG. 30

(58) Field of Classification Search
CPC ............... E05C 1/14; E05C 1/04; E05C 1/10; E05C 1/002; E05C 1/12; E05C 9/1833; E05C 9/1883; E05C 65/006
USPC ............. 292/32, 57, 58, 60, 63, 143, DIG. 30
See application file for complete search history.

(56) References Cited

U.S. PATENT DOCUMENTS

| | | | | |
|---|---|---|---|---|
| 6,517,129 | B1* | 2/2003 | Chien et al. | 292/251.5 |
| 7,201,409 | B2* | 4/2007 | Adachi et al. | 292/304 |
| 7,549,684 | B2* | 6/2009 | Shi et al. | 292/37 |
| 8,424,933 | B2* | 4/2013 | Xu et al. | 292/163 |

* cited by examiner

*Primary Examiner* — Mark Williams
(74) *Attorney, Agent, or Firm* — Li & Cai Intellectual Property (USA) Office

(57) ABSTRACT

A housing structure includes a main cabinet and an engaging mechanism. The main cabinet has an opening formed on one side, and the main cabinet has a side panel and a latch. The opening can be covered up by the side panel, and the latch can be movably arranged on the side panel. The engaging mechanism includes a sliding member and an elastic member, and the sliding member can be slidably arranged on the main cabinet and is adjacent to the latch. A plurality of grooves is formed on the sliding member, and a plurality of hooks is formed correspondingly on the side panel. The sliding member can traverse between a default and a release position to assemble or dissemble the main cabinet.

15 Claims, 14 Drawing Sheets

COMPUTER HOUSING STRUCTURE

BACKGROUND OF THE INVENTION

1. Field of the Invention

The instant disclosure relates to a computer housing structure; more particularly, to a screw-less type removable side panel structure.

2. Description of the Related Art

The use of electronics has become an essential part of the society today. In general, an electronic device has a housing to protect its internal electrical elements. Please refer to FIG. 1, which shows an exploded view of a conventional housing structure 1. The housing structure 1 comprises a main cabinet 11 and a side panel 12. The main cabinet 11 and the side panel 12 can be assembled to form an enclosure. The enclosure is used to house the electrical elements of the electronic device. A bend 14 is formed on one side of the side panel 12. Mounting holes 15 are formed on the bend 14 and the main cabinet 11. Screws 13 for the mounting holes 15 are used to assemble the side panel 12 with the main cabinet 11, thereby enclosing the electrical elements for protection.

However, to disassemble the housing structure 1, significant labor and time must be spent to remove the screws. Furthermore, when troubleshooting, the screws 13 must be loosened one by one to remove the side panel 12. After the inspection is complete, each screw 13 must be driven into the mounting holes 15 to reassemble the housing structure 1. Such conventional process is troublesome and inefficient for troubleshooting the electronic devices. In addition, a tool must be available to assemble or disassemble the housing structure 1. However, such type of tool is not carried ordinarily by the user of the electronic device. The user has to either scramble for any available tool or request technical support. Otherwise, the troubleshooting process can not be initiated.

Since the conventional fastening method is time and labor consuming, the provision of a screw-less side panel is given great emphasis.

To address the above issues, the inventor strives via industrial experience and academic research to present the instant disclosure, which can effectively improve the limitations described above.

SUMMARY OF THE INVENTION

The instant disclosure provides a housing structure, which comprises a main cabinet and an engaging mechanism. The main cabinet is formed with an opening on one side, and the main cabinet also includes a side panel and a latch. The side panel can be disposed over the opening, and the latch is movably disposed adjacent to the side panel. The engaging mechanism includes a sliding member and an elastic member. The sliding member can be movably arranged on the main cabinet and adjacent to the latch. A plurality of grooves is formed on the sliding member, and a plurality of hooks is formed correspondingly on the side panel. The elastic member is coupled to the main cabinet and the sliding member on opposite ends. When the sliding member is not pressed by the latch, the sliding member is held by the elastic member at a default position. The grooves are engaged by the hooks, while the opening is being covered by the side panel. When the sliding member is pushed by the latch to a release position, the hooks are released from the grooves for displacing the side panel away from the opening.

The latch has a protruding portion directed toward the sliding member.

Likewise, an inwardly curved portion is formed at a corner of side panel, and the latch is pivotally disposed on the side panel to complement the curved portion. A sloped surface is formed on one end of the sliding member with respect to the protrusion of the latch. When the latch is rotated, the protrusion abuts and pushes the sloped surface to displace the sliding member longitudinally.

Also for the housing structure, an extension is formed near the edge of the main cabinet, and the sliding member includes a main shaft and at least one sliding block. The sliding block is fixed to the main shaft, and the sliding member can be movably arranged on the extension.

At least one first through hole and at least one second through hole are formed on the extension. The first through hole is substantially T-shaped with a narrow portion thereof formed along the longitudinal axis of the sliding member projecting toward the latch.

The sliding block has an engaging portion for engaging the first through hole.

The housing structure further comprises an elasticity-recovering member having two opposite ends. The two opposite ends abut against the main cabinet and the latch, respectively.

The main shaft of the housing structure is made of metal.

The main shaft of the housing structure is made of steel.

The sliding block of the housing structure is made of plastic.

The sliding block of the housing structure is made of material selected from a group consisting of polypropylene (PP), polyethylene (PE), polystyrene (PS), polyvinyl chloride (PVC) polyoxymethylene (POM), polycarbonate (PC), acrylonitrile butadiene styrene, polystyrene (ABS), nylon, ethylene-vinyl acetate (EVA), rubber, and a combination thereof The instant disclosure has the following advantages. Namely, the engagement by the hooks to the grooves of the sliding member allows the side panel to cover the opening with ease in assembling to the main cabinet. Thus, no screws are needed, and the assembling/dissembling process of the housing structure is simplified. When disassembling the housing structure, the user does not have to loosen the screws one-by-one, but instead can simply operate the latch to remove the side panel off the opening. In addition, no accessories or tools are needed to install or remove the side panel, providing more convenience to the user.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENTS

Figure 1:
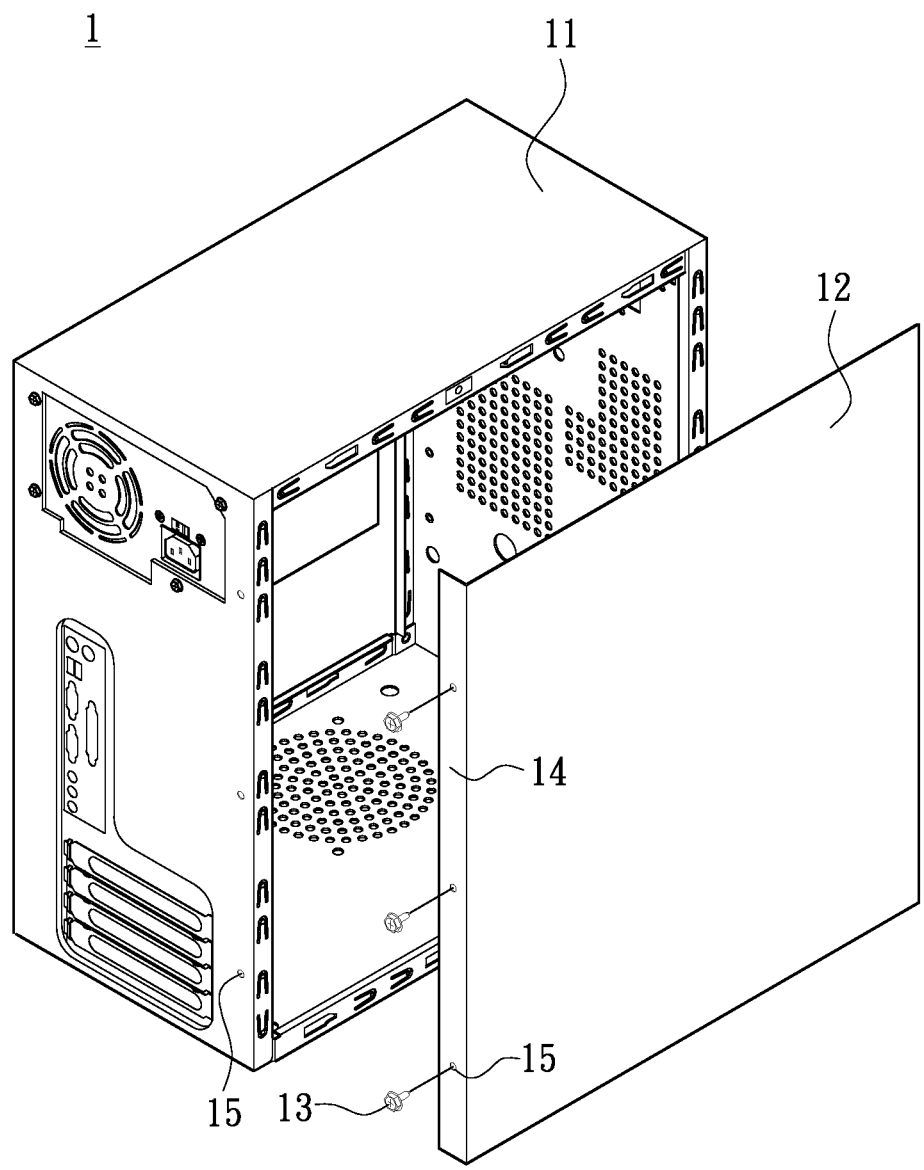
FIG. 1 is an exploded view of a conventional housing structure.
Figure 2:
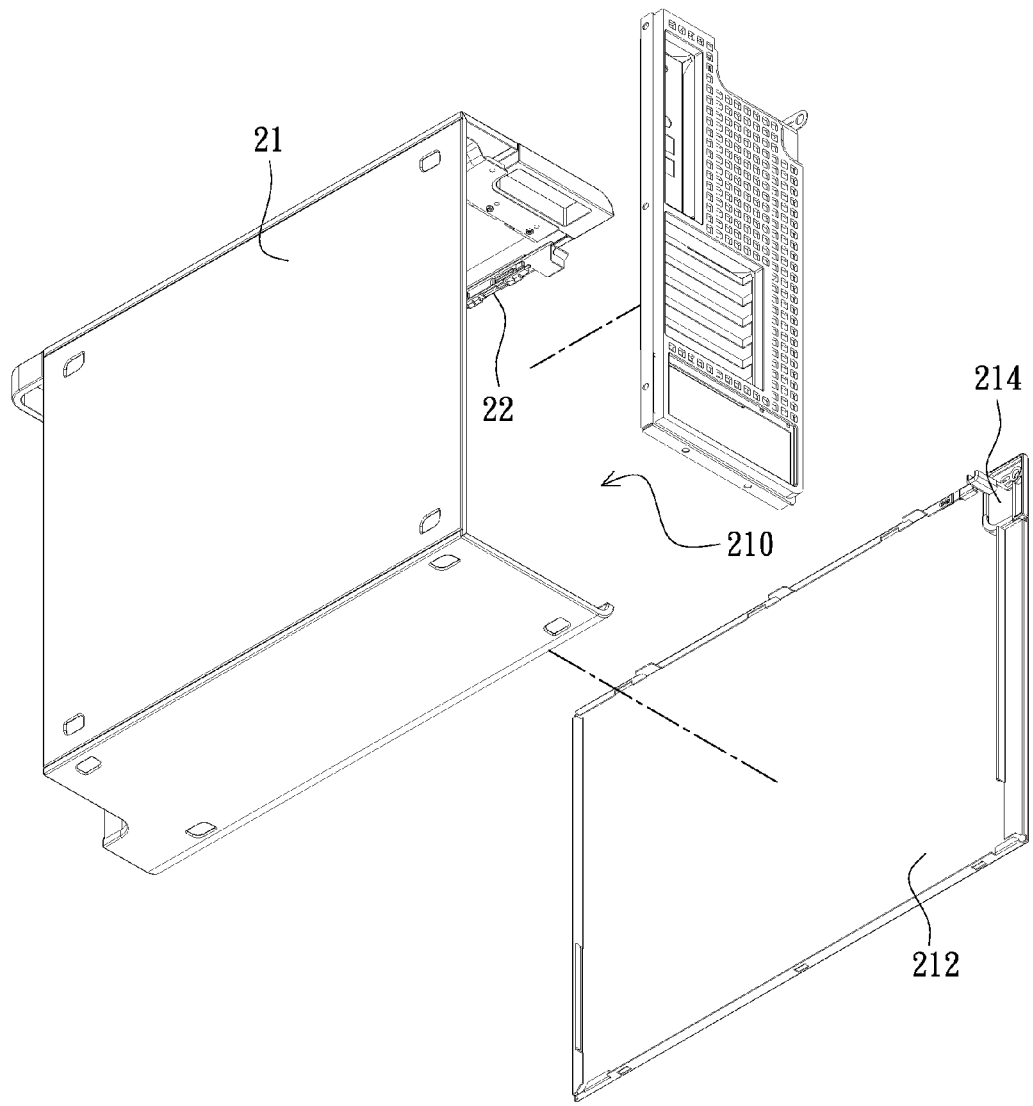
FIG. 2 is an exploded view of a housing structure of the instant disclosure.

Please refer to FIG. 2, which shows an exploded view of a housing structure 2 of the instant disclosure. The housing structure 2 comprises a main cabinet 21 and an engaging mechanism 22. The main cabinet 21 has a side panel 212 and a latch 214. An opening 210 is formed on one side of the main cabinet 21, and the opening 210 can be covered by the side panel 212. Structurally, the side panel 212 matches in shape and size to the opening 210. Thereby, different electrical components may be protected inside the main cabinet 21.

Figure 3:
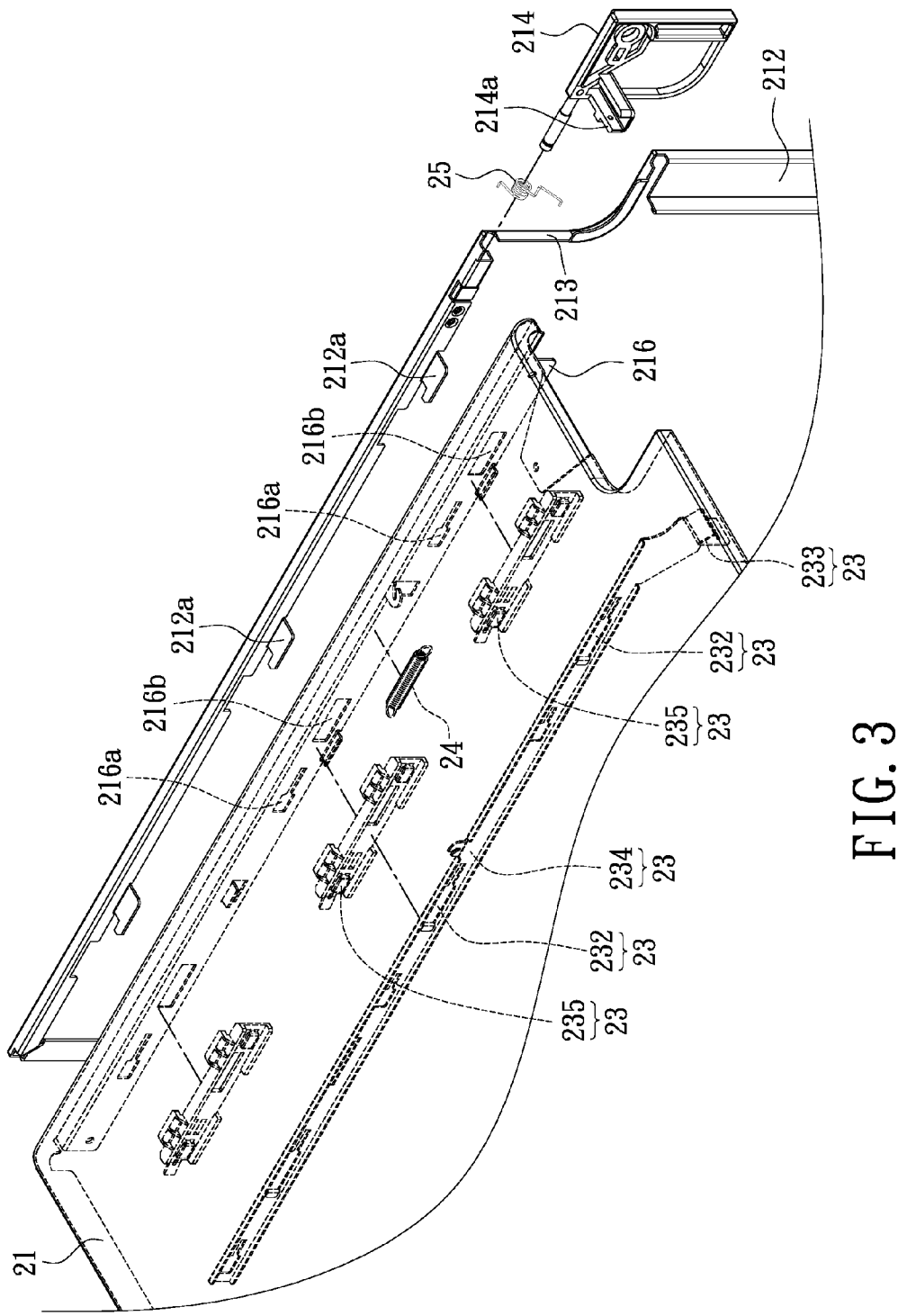
FIG. 3 is a partial exploded view of the housing structure of the instant disclosure.
Figure 4:
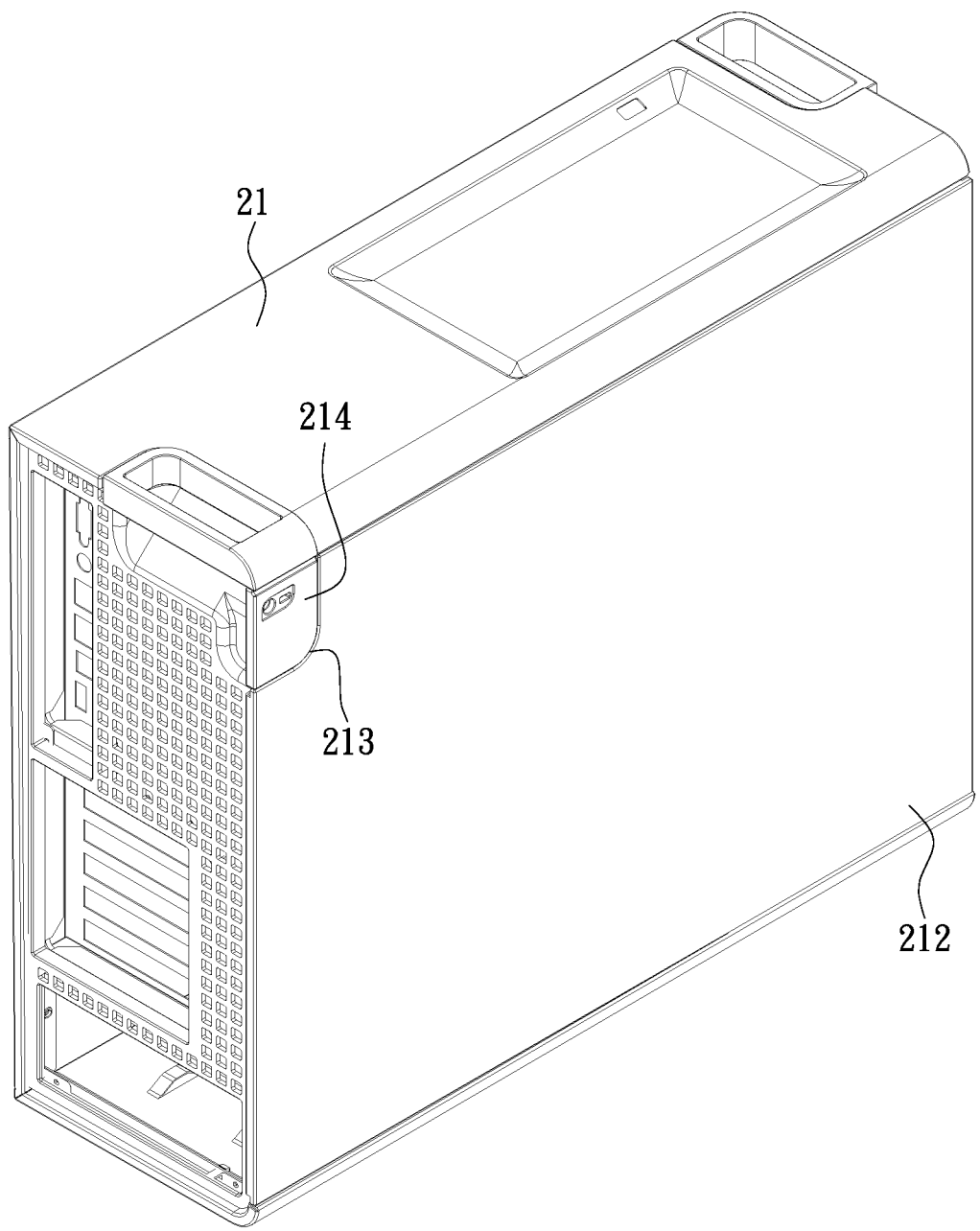
FIG. 4 is a perspective view of the assembled housing structure of the instant disclosure.
Figure 5:
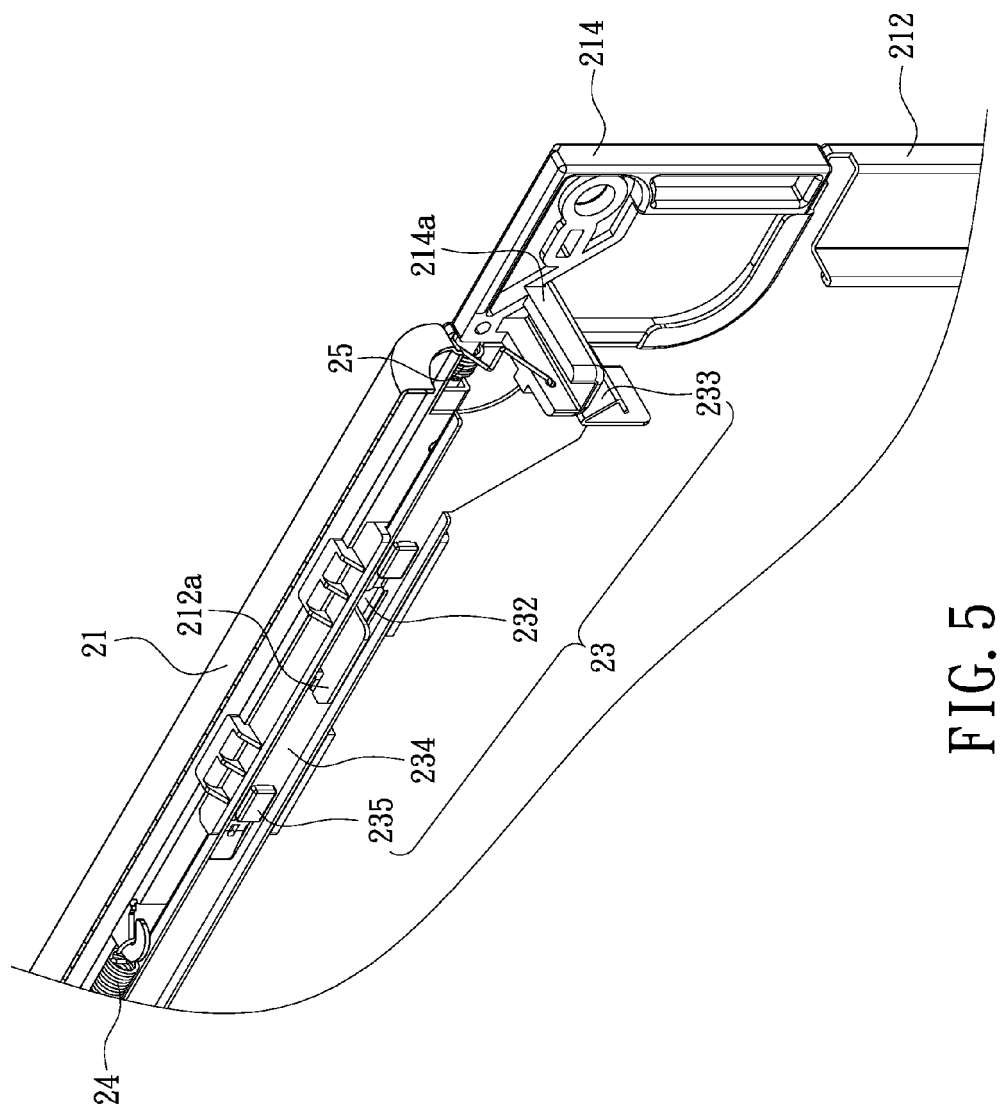
FIG. 5 is a perspective view of an engaging mechanism of the housing structure of the instant disclosure at a locked state.
Figure 6:
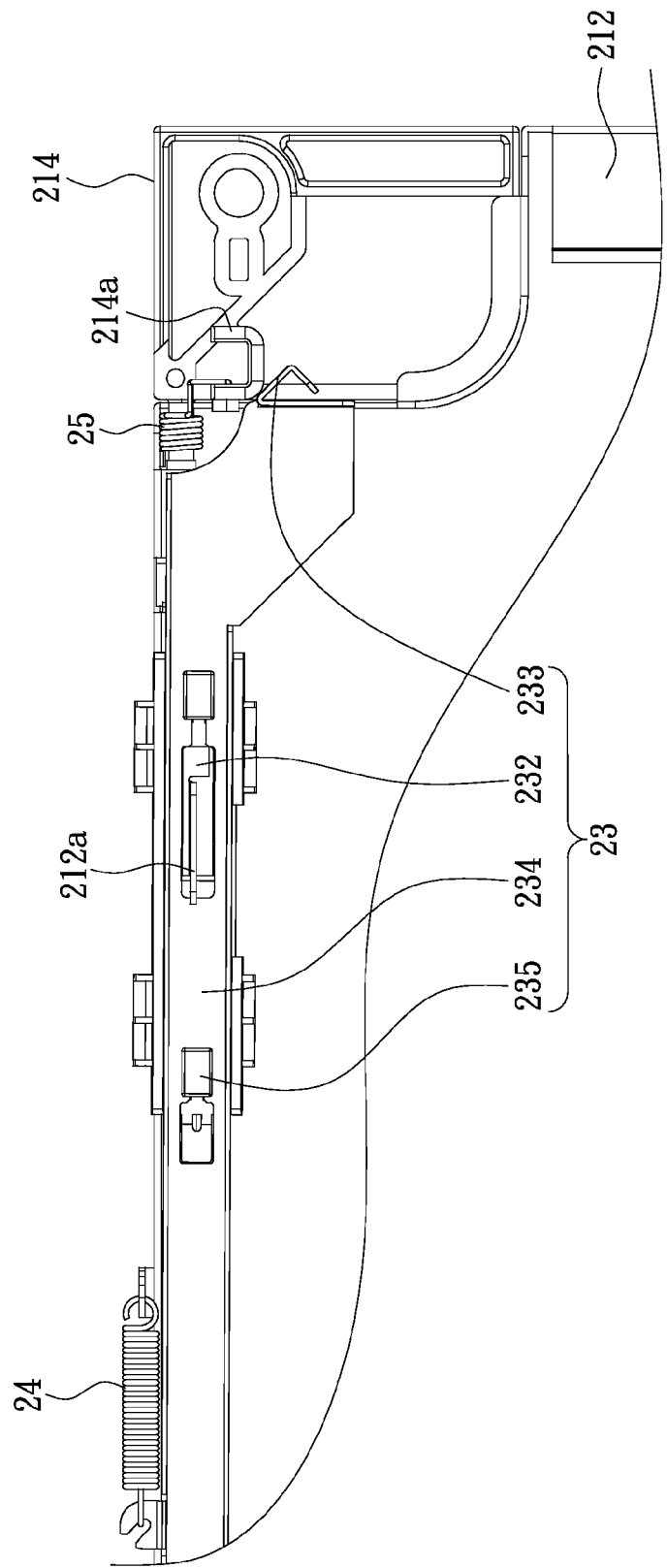
FIG. 6 is a side view of FIG. 5.
Figure 7:
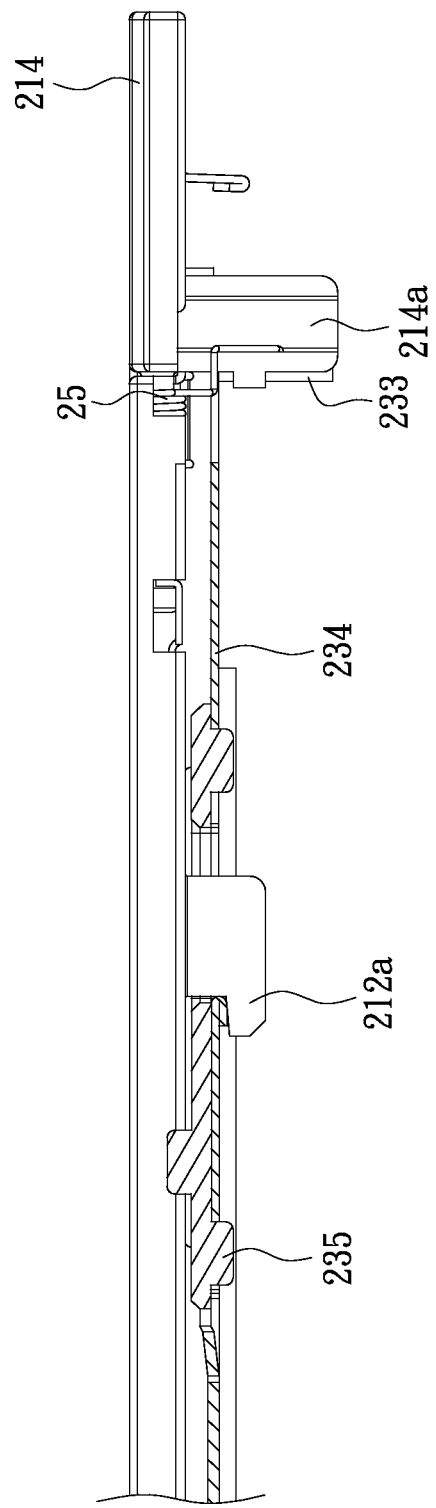
FIG. 7 is a top view of FIG. 5.

Further details can be seen in FIG. 3, which shows an exploded view of a portion of the housing structure 2. The latch 214 can be movably disposed adjacent to the side panel 212. Preferably, an inwardly curved portion 213 is formed at an upper corner of the side panel 212. One end of the latch 214 is pivotally disposed on the side panel 212 to complement the curved portion 213. Furthermore, an extension 216 is formed by extending from the outer edge portion of the main cabinet 21. At least one first through hole 216a and at least one second through hole 216b are formed on the extension 216. Preferably, the extension 216 is formed having a plate-like structure, to matchingly contact with the side panel 212. The engaging mechanism 22 further comprises a sliding member 23 and an elastic member 24. The sliding member 23 can be slidably arranged on the extension 216, and the elastic member 24 is connected to the main cabinet 21 and the sliding member 23 on opposite ends. Preferably, the sliding member 23 includes a main shaft 234 and a plurality of sliding blocks 235. One side of each sliding block 235 is engaged to the main shaft 234, and an opposite side thereof has an engaging portion (not shown) for snapping to the corresponding first through hole 216a. Thereby, the sliding member 23 can be movably arranged on the extension 216. More specifically, the first through hole 216a of the instant embodiment is T-shaped with the narrow region projected toward the latch 214, thus allowing the sliding block 235 to be movably arranged on the extension 216. The above configuration is only an example. The movement of the sliding member 23 can be achieved with other means without restriction. Furthermore, a plurality of grooves 232 is formed on the sliding member 23. A plurality of hooks 212a is arranged protrudingly on the side panel 212 and projected toward the sliding member 23. In sequence, each hook 212a is projected through the corresponding second through hole 216b and the groove 232 of the sliding member 23, to secure the main cabinet 21 with the side panel 212.

Please refer to FIGS. 4~7, which show the housing structure 2 at an assembled state. For the instant embodiment, the sliding member 23 has a longitudinal axis parallel to the extension 216. The latch 214 has a protruding portion 214a formed toward the sliding member 23 and a pivoting axis. The pivoting axis is preferably parallel to the longitudinal axis of the sliding member 23. The sliding member 23 has a sloped surface 233 formed on one end thereof abutting to the protruding portion 214a of the latch 214. When the latch 214 pivots, the sloped surface 233 can be pushed by the protruding portion 214a to displace the sliding member 23. The pivoting motion of the latch 214 is only an exemplary operation. Based on needs, the latch 214 can be movably arranged on the main cabinet 21 using other means, to displace the sliding member 23 horizontally between a default position and a release position. Without restrictions, any other means that can achieve the above-described operation are under the scope of the instant disclosure. Please refer to FIG. 5, which shows the sliding member 23 is being held by the elastic member 24 at the default position, with no external force applied to the latch 214. When the sliding member 23 is not displaced by the latch 214, the hooks 212a of the side panel 212 are engaged to respective grooves 232 of the sliding member 23, such that the side panel 212 covers the opening 210.

Figure 8:
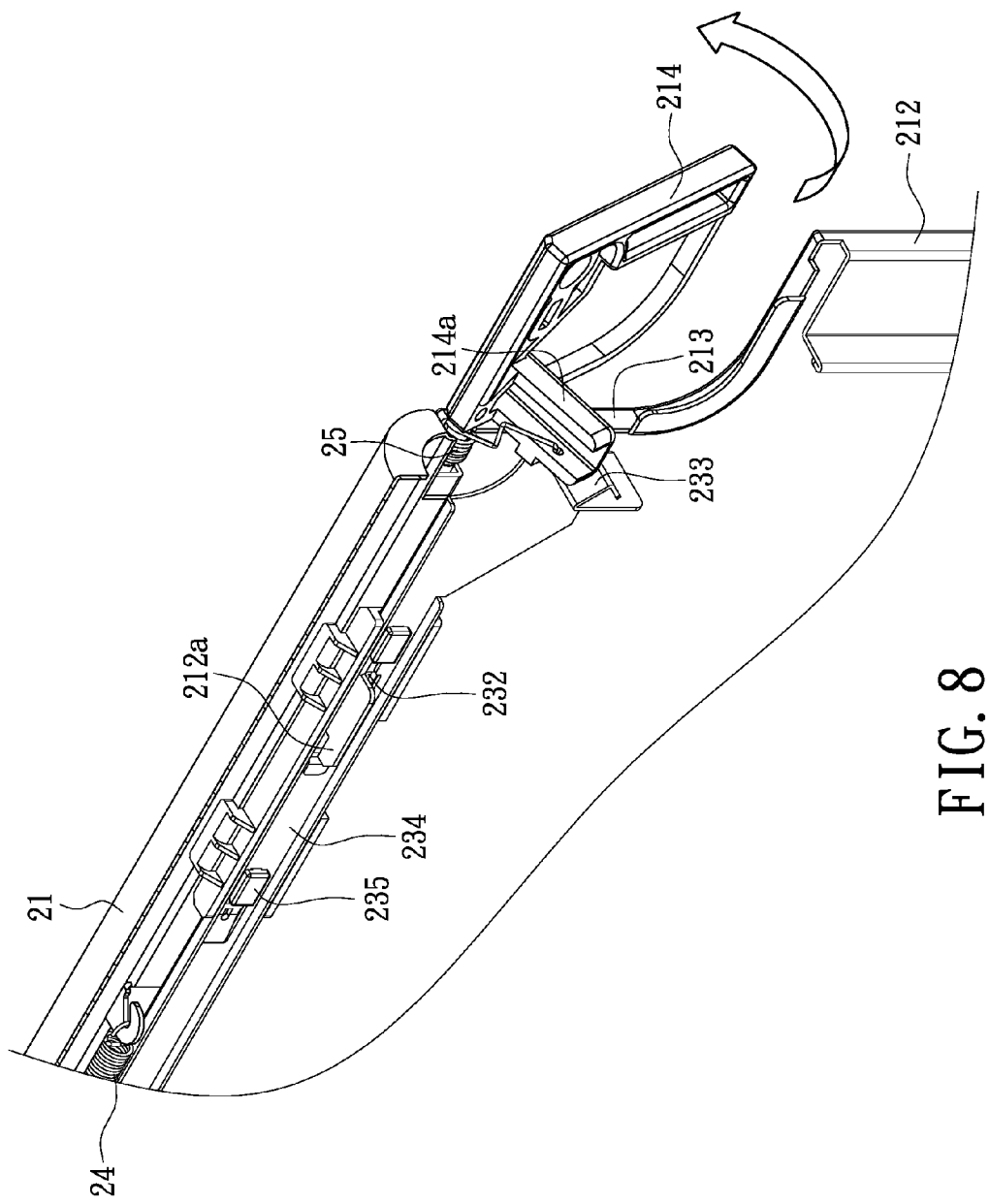
FIG. 8 is a perspective view of the engaging mechanism of the housing structure of the instant disclosure at a released state.
Figure 9:
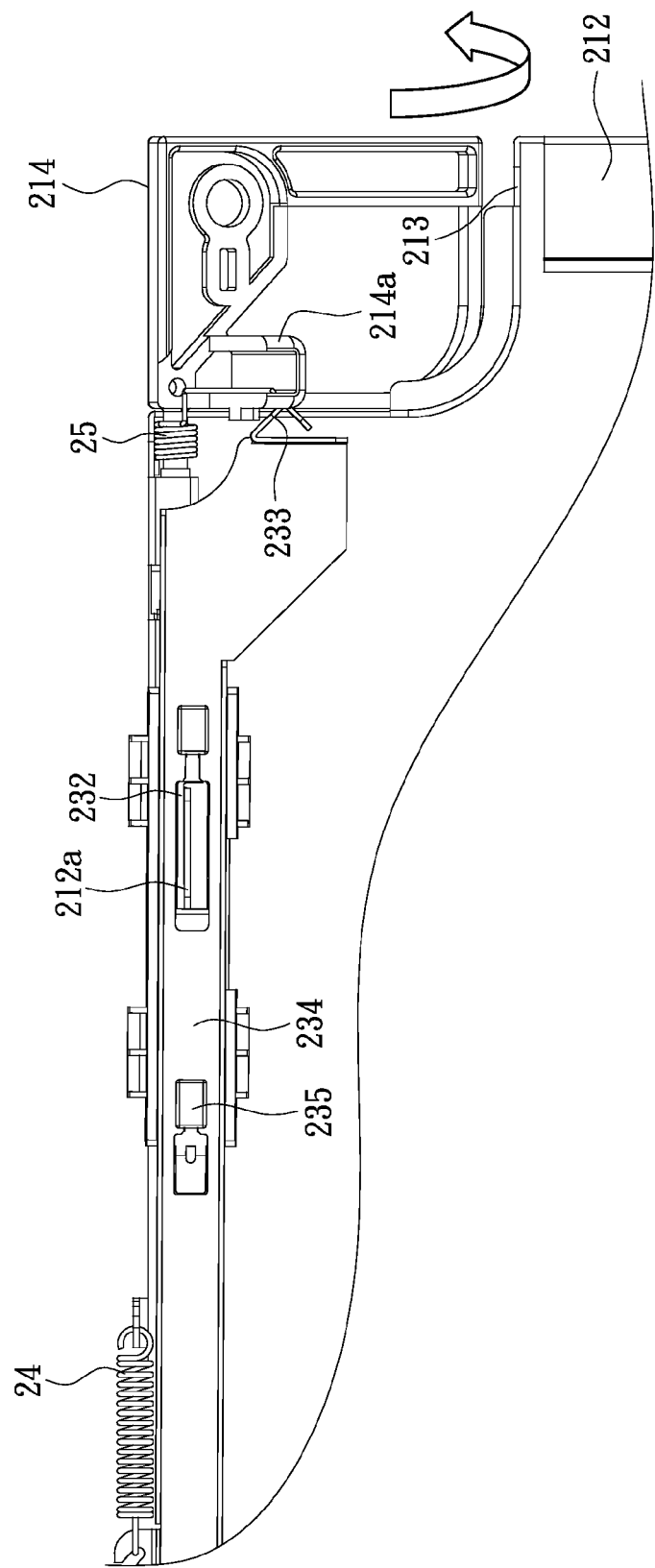
FIG. 9 is a side view of the view of FIG. 8.
Figure 10:
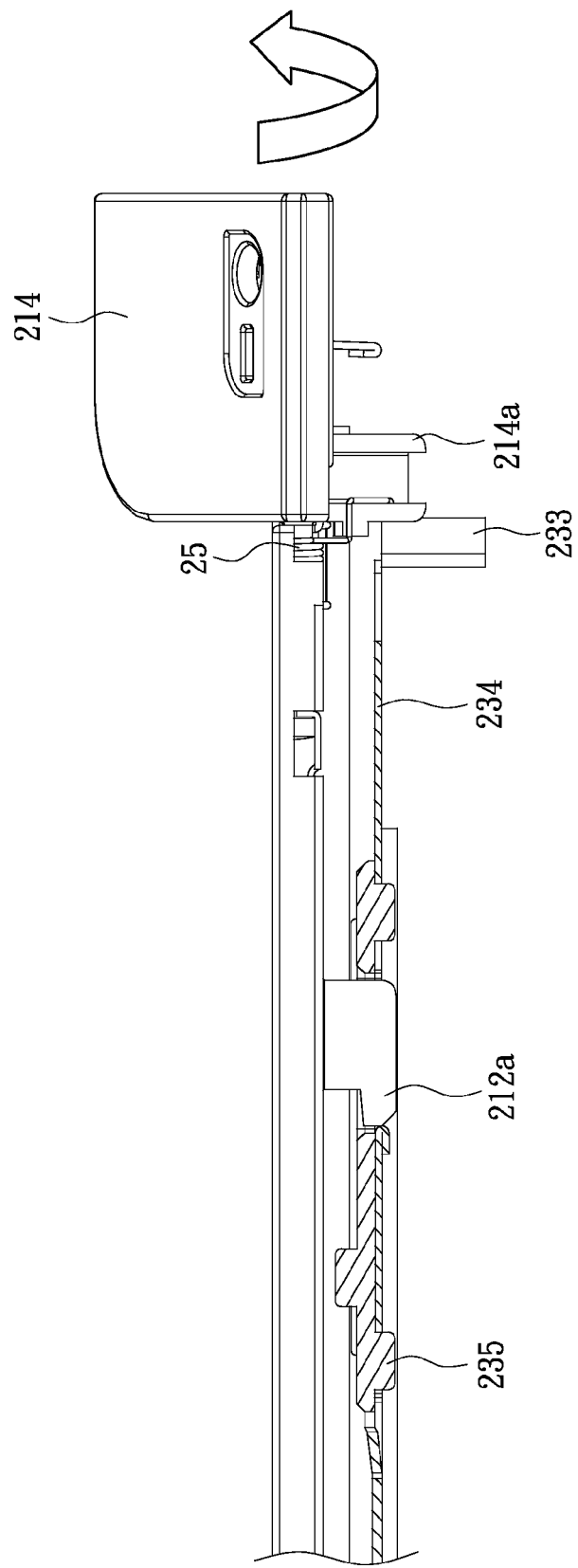
FIG. 10 is a top view of FIG. 8.

Please refer to FIGS. 8~10, which show a perspective view, a side view, and a top view of the housing structure 2 when the side panel 212 is being disengaged from the main cabinet 21, respectively. When the hinged latch 214 is pulled outward radially, the protruding portion 214a of the latch 214 abuts and pushes the sloped surface 233, in displacing the sliding member 23 away from the latch 214 and toward the release position. Thereby, the grooves 232 are released by the hooks 212a.

After the hooks 212a have disengaged from the grooves 232, the user only needs to apply an external force to pull the side panel 212 away from the sliding member 23 to uncover the opening 210. Please refer to FIGS. 11~14, which show the disengagement of the side panel 212 from the housing structure 2. As shown in the figures, the housing structure 2 further includes an elasticity-recovering member 25. The elasticity-recovering member 25 has two opposite ends arranged on the side panel 212 and the latch 214, respectively. Preferably, the elasticity-recovering member 25 is abutted to the side panel 212 of the housing 21 and the protruding portion 214a of the latch 214 on respective ends, thus maintaining the latch 214 at the default position. After the side panel 212 has been separated from the main cabinet 21, the user can stop applying the external force to the latch 214. Then, the elasticity-recovering member 25 would restore and apply a restoring force to the latch 214, thus returning the latch 214 radially to its default position.

Oppositely, if the user wishes to cover the opening 210 with the side panel 212, the user only needs to apply an external force in moving the side panel 212 toward the opening 210. The hooks 212a would abut and push the sliding member 23 before engaging the grooves 232. The detailed operations are similar to the removal of the side panel 212 as previously discussed, thus are not repeated again herein.

Material-wise, the main shaft 234 is preferably made of metal material, such as steel, which provides longer service life. The sliding block 235 is preferably made of plastic material, such as polypropylene (PP), polyethylene (PE), polystyrene (PS), polyvinyl chloride (PVC), polyoxymethylene (POM), polycarbonate (PC), acrylonitrile butadiene styrene (ABS), nylon, ethylene-vinyl acetate (EVA), rubber, or related compounds. By made of plastic, noise due to frictions when the sliding block 235 slides along the extension 216 can be avoided. The latch 214 is preferably made of metal, such as aluminum alloy, to provide better bending resistance against external force.

Figure 11:
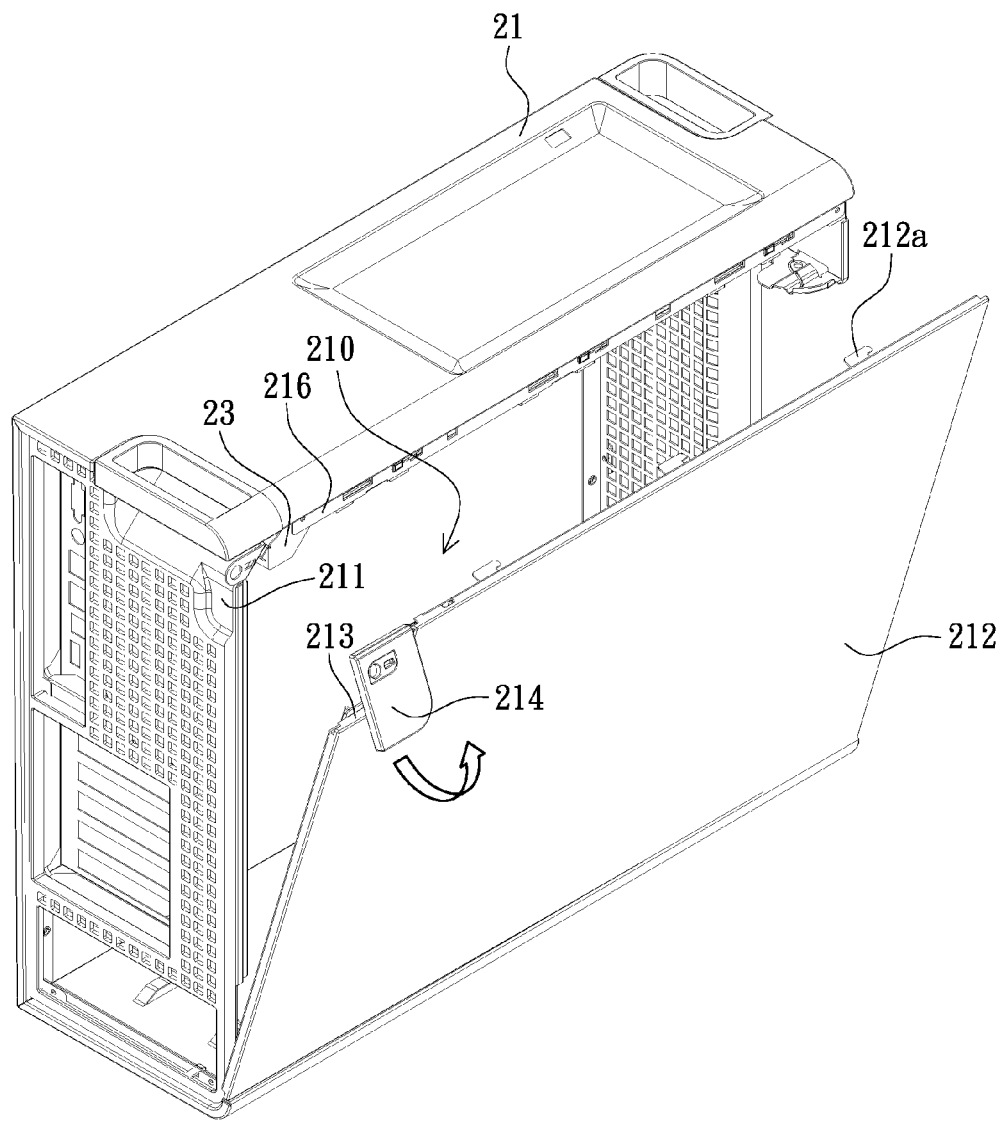
FIG. 11 is a perspective view of the housing structure of the instant disclosure being disassembled.
Figure 12:
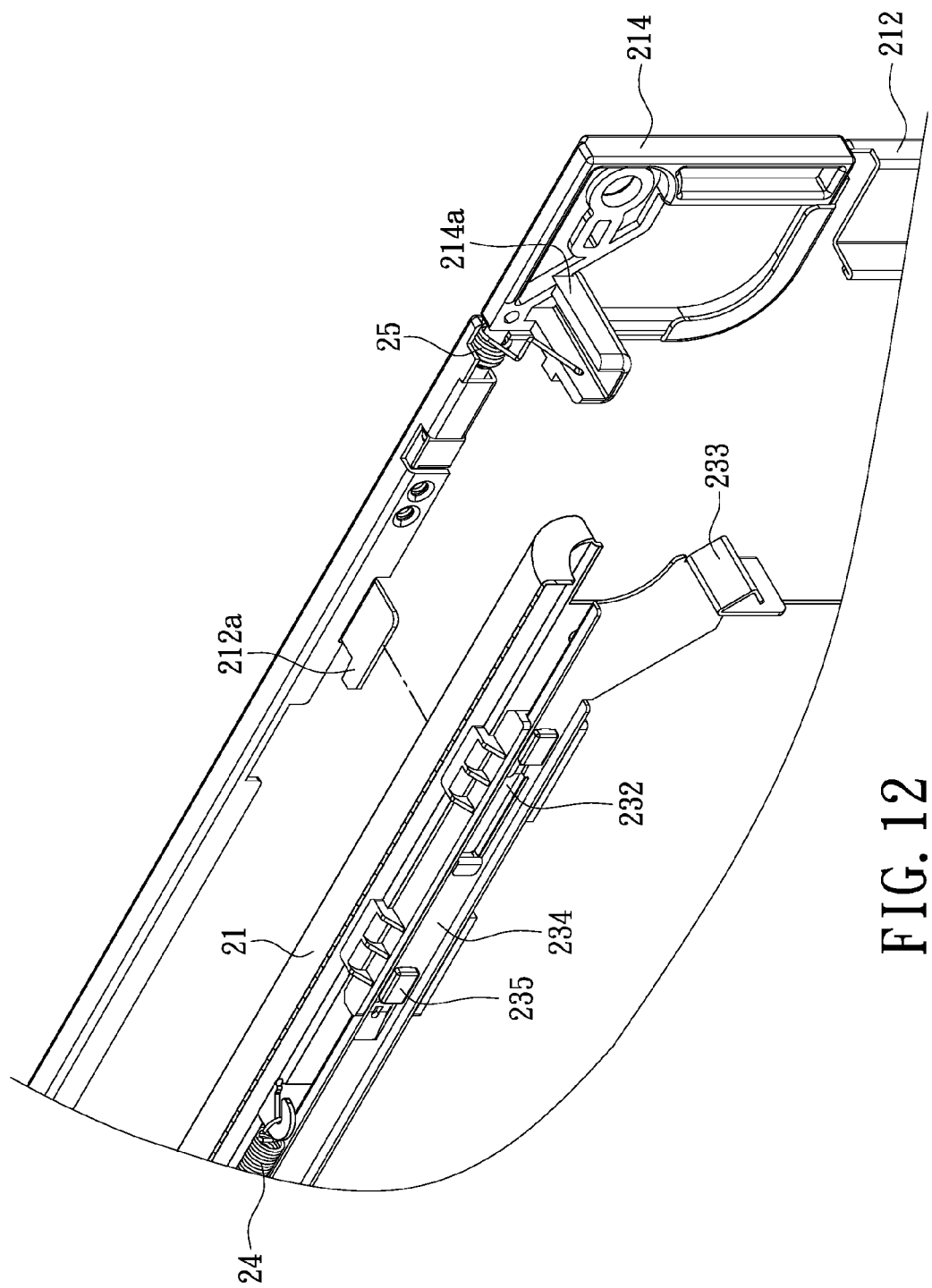
FIG. 12 is a perspective view of the side panel after being disengaged from the main cabinet for the housing structure of the instant disclosure.
Figure 13:
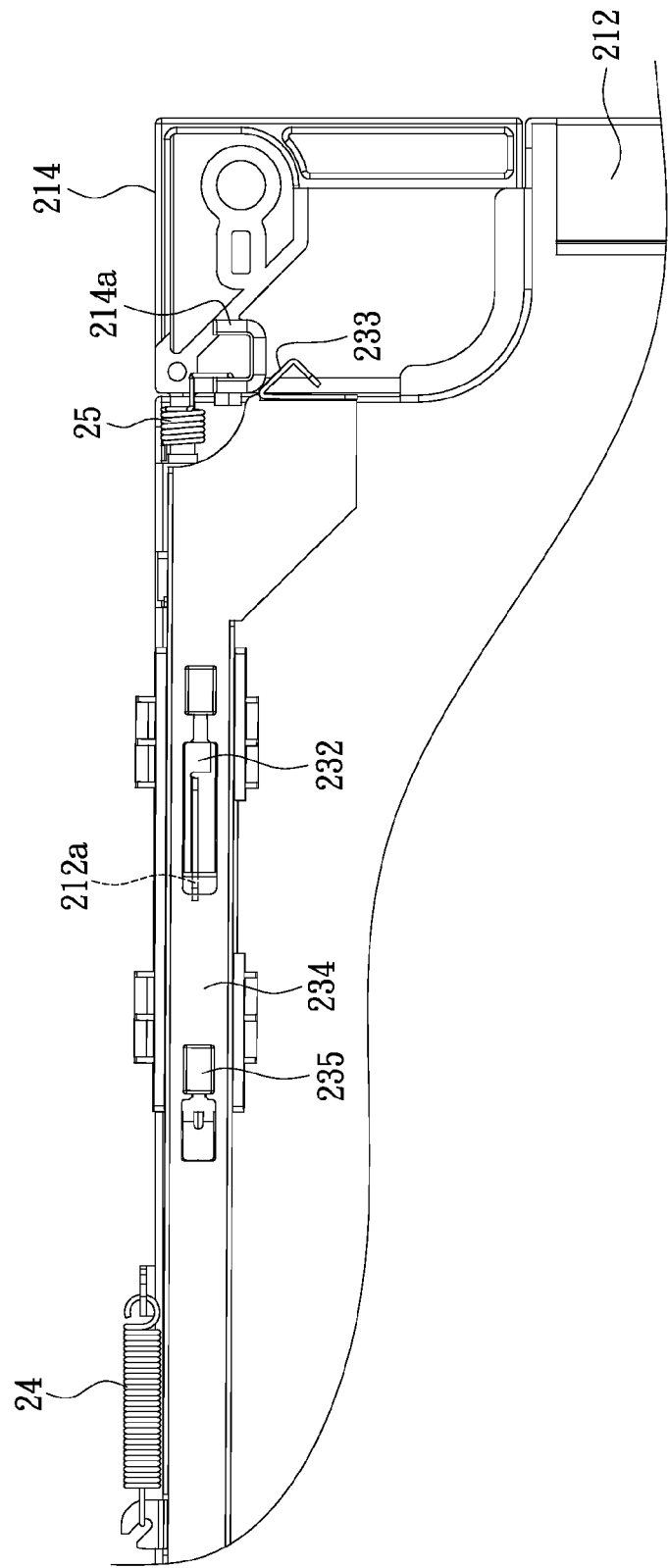
FIG. 13 is a side view of FIG. 12.
Figure 14:
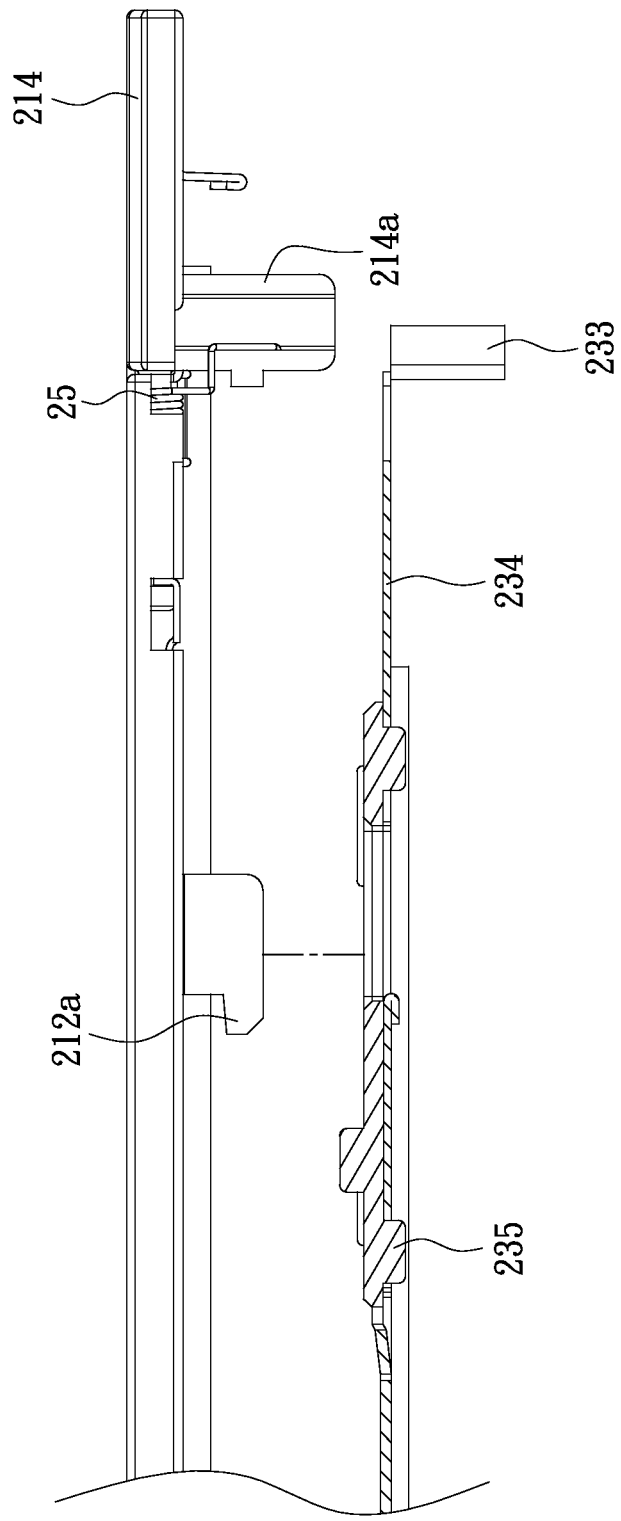
FIG. 14 is a top view of FIG. 12.

As shown in FIG. 11, a hole 211 is formed on the main cabinet 21 adjacent to the curved portion 213. Notably, the latch 214 is arranged adjacently to the hole 211, allowing the user to fit his/her fingers through the hole 211 and turn the latch 214 away from the main cabinet 21. The radial movement of the latch 214 displaces the sliding member 23 to the release position, thus disengaging the hooks 212a from the grooves 232. Thereby, the side panel 212 can be released from the main cabinet 21. The above description is for explaining purpose only and is not used to limit the scope of the instant disclosure.

The quantity and shape of the hooks 212a and the grooves 232 can be varied accordingly. For example, the housing structure 2 of the instant disclosure may include three hooks 212a and three grooves 232, but is not restricted thereto. Any related modifications to the above technical features are under the scope of the instant disclosure.

In summary, a complete main cabinet 21 is achieved by the engagement between the grooves of the sliding member and the hooks of the side panel. In comparing to conventional techniques, the disassembling/assembling of the housing structure of the instant disclosure involves no screws or bolts, which greatly simplifies the disassembling/assembling process of the housing structure and saves time. Plus, the adoption of the metal main shaft and plastic sliding blocks increase the service life and eliminate noise generation.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims

What is claimed is:

1. A housing structure, comprising:
a main cabinet having an opening formed on one side thereof, a side panel to cover the opening, and a latch pivotally arranged on the main cabinet near the opening; and
an engaging mechanism having a sliding member and an elastic member, the sliding member being movably arranged on the main cabinet and adjacent to the latch, the elastic member being coupled to the main cabinet and the sliding member on opposite ends, at least one groove and at least one hook being formed on the sliding member and the side panel, respectively;
wherein the latch has a protruding portion, an inwardly curved portion is formed on a corner of the side panel, the latch is pivotally arranged on the side panel to complement the curved portion, a sloped surface is formed on one end of the sliding member with respect to the latch, wherein when the latch is pivoted, the protruding portion pushes the sloped surface to displace the sliding member, the rotation plane of the protruding portion is normal to and non-coplanar with respect to the displacement direction of the sloped surface.

2. The housing structure of claim 1, wherein the protruding portion is disposed toward the sliding member.

3. The housing structure of claim 1, wherein when the sliding member is not pushed by the latch, the sliding member is held by the elastic member, while the hook is engaged to the groove for covering the opening by the side panel, wherein when the sliding member is pushed by the latch, the hook is released from the groove for removing the side panel from the main cabinet.

4. The housing structure of claim 1, wherein an extension is formed near an edge portion of the main cabinet, wherein the sliding member includes a main shaft and at least one sliding block, the sliding block being fixedly secured to the main shaft, and wherein the sliding member is movably arranged on the extension.

5. The housing structure of claim 4, wherein at least one first through hole and at least one second through hole are formed on the extension, and wherein the first through hole is substantially T-shaped with a narrow portion thereof formed along the longitudinal axis of the sliding member toward the latch.

6. The housing structure of claim 5, wherein the sliding block has an engaging portion for snapping to the first through hole.

7. The housing structure of claim 6, further comprising an elasticity-recovering member abutted to the main cabinet and the latch on opposite ends.

8. The housing structure of claim 4, wherein the main shaft is made of metal.

9. The housing structure of claim 4, wherein the main shaft is made of steel.

10. The housing structure of claim 4, wherein the sliding block is made of plastic.

11. The housing structure of claim 4, wherein the sliding block is made of a material selected from the group consisting of polypropylene, polyethylene, polystyrene, polyvinyl chloride, polyoxymethylene, polycarbonate, acrylonitrile butadiene styrene, nylon, ethylene-vinyl acetate (EVA), rubber, and a combination thereof.

12. A housing structure, comprising:
a main cabinet having an opening formed on one side thereof, a side panel to cover the opening and a latch movably pivotally on the main cabinet near the opening; and
an engaging mechanism having a sliding member and an elastic member, the sliding member being movably arranged on the main cabinet and adjacent to the latch, the elastic member being coupled to the main cabinet and the sliding member on opposite ends, at least one groove and at least one hook being formed on the sliding member and the side panel, respectively;
wherein an extension is formed near an edge portion of the main cabinet, at least one first through hole and at least one second through hole are formed on the extension, the sliding member includes at least one sliding block, and the sliding block has an engaging portion for snapping to the first through hole, wherein the latch has a protruding portion, when the latch is pivoted, the protruding portion pushes the sloped surface to displace the sliding member, the rotation plane of the protruding portion is normal to and non-coplanar with respect to the displacement direction of the sloped surface.

13. The housing structure of claim 12, wherein when the sliding member is not pushed by the latch, the sliding member is held by the elastic member, while the hook is engaged to the groove for covering the opening by the side panel, wherein when the sliding member is pushed by the latch, the hook is released from the groove for removing the side panel from the main cabinet.

14. A housing structure, comprising:
a main cabinet having an opening formed on one side thereof, a side panel to cover the opening and a latch pivotally arranged on the main cabinet near the opening;
an engaging mechanism having a sliding member and an elastic member, the sliding member being movably arranged on the main cabinet and adjacent to the latch, the elastic member being coupled to the main cabinet and the sliding member on opposite ends, at least one groove and at least one hook being formed on the sliding member and the side panel, respectively; and an elasticity-recovering member having two opposite ends respectively abutted to the main cabinet and the latch, wherein the latch has a protruding portion, when the latch is pivoted, the protruding portion pushes the sloped surface to displace the sliding member, the rotation plane of the protruding portion is normal to and non-coplanar with respect to the displacement direction of the sloped surface.

15. The housing structure of claim 14, wherein when the sliding member is not pushed by the latch, the sliding member is held by the elastic member, while the hook is engaged to the groove for covering the opening by the side panel, wherein when the sliding member is pushed by the latch, the hook is released from the groove for removing the side panel from the main cabinet.

\* \* \* \* \*